Jan. 16, 1934.  N. T. SKOWLUND  1,944,114

ICE CREAM FREEZING ATTACHMENT

Filed June 6, 1932

Inventor

Nels T. Skowlund

By Geo. P. Kimmel

Attorney

Patented Jan. 16, 1934

1,944,114

UNITED STATES PATENT OFFICE 1,944,114

ICE CREAM FREEZING ATTACHMENT

Nels T. Skowlund, Marinette, Wis.

Application June 6, 1932. Serial No. 615,696

3 Claims. (Cl. 259—105)

This invention relates to an ice cream freezing attachment for mechanical refrigerators employed for the storage of ice cream, ices, frozen edibles, etc., in retail establishments, and has for its object to provide, in a manner as hereinafter set forth, means capable of being readily positioned in one of the storage wells and readily connected to and driven from the operating mechanism of the refrigerator for freezing ice cream when desired.

A further object of the invention is to provide, in a manner as hereinafter set forth, a simple, compact, strong, unitary and relatively inexpensive equipment for use in connection with a mechanical refrigerator, at counters when ice cream is sold for the purpose of manufacturing ice cream at such frequent intervals as may be required to furnish freshly frozen ice cream.

To the above ends essentially and to others which may hereinafter appear, the invention consists of such parts and such combination of parts which fall within the scope of the invention as claimed.

Figure 1:
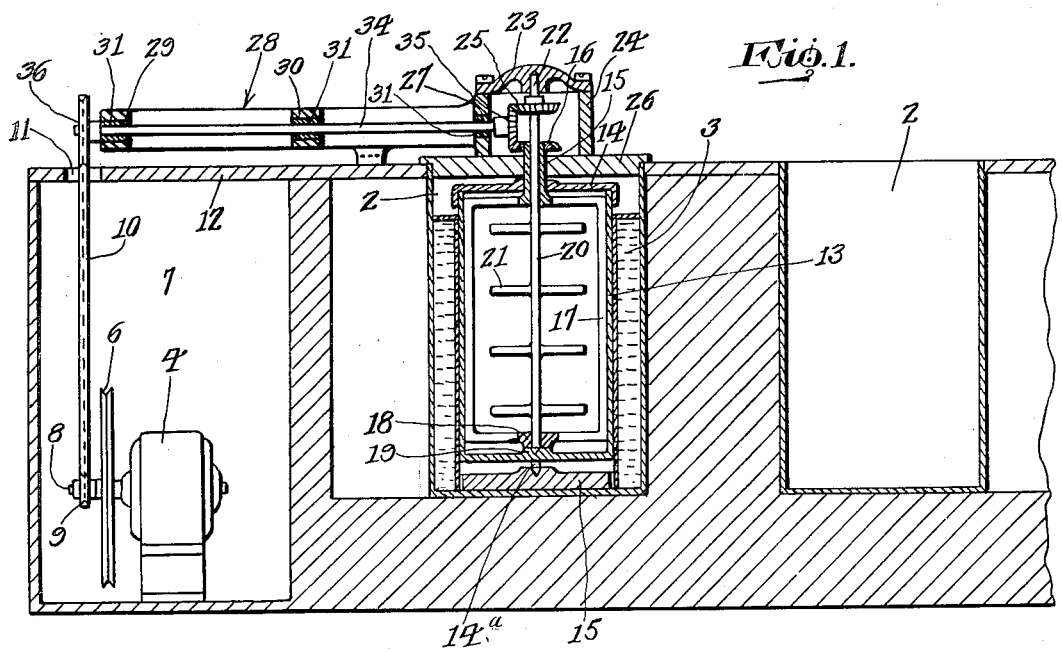
Figure 1 is a fragmentary view in longitudinal section of a mechanical refrigerator showing the adaptation therewith of an ice cream freezing attachment in accordance with this invention.
Figure 2:
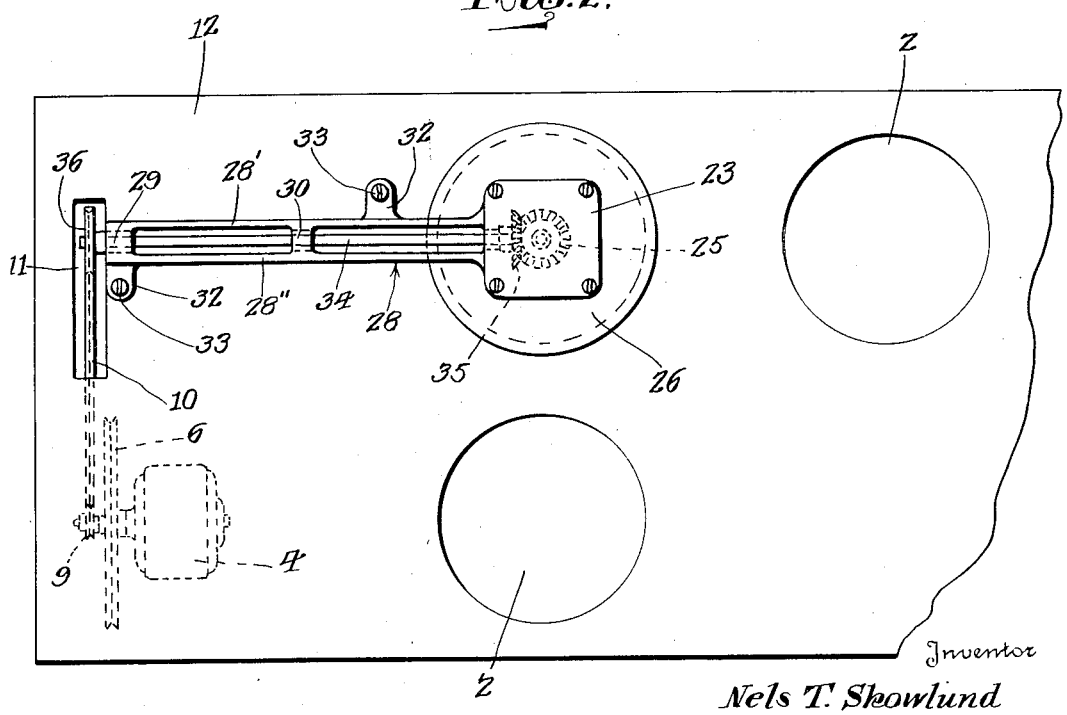
Figure 2 is a fragmentary view in top plan of a mechanical refrigerator showing the adaptation therewith of an ice cream freezing attachment in accordance with this invention.

Referring to the drawing, 1 indicates the cabinet of a mechanical refrigerator, and which is provided with a plurality of wells 2 opening at the top of cabinet 1. The wells are for the reception of removable storage cans, not shown, for the merchandise which is to be refrigerated. Coacting with each storage well, as is well known, is a refrigerant jacket 3, only one is shown. The motor of the operating mechanism of the refrigerator is designated 4, and the shaft 5 thereof carries a pulley 6 for driving a compressor, not shown. A compartment 7 is provided for the motor. Each well has a cover, not shown. The foregoing elements are shown and referred to by way of example to enable one to readily understand the adaptation therewith of the hereinafter referred to ice cream freezing attachment in accordance with this invention.

The attachment includes a shaft 8 which is detachably connected to motor shaft 5 in any suitable manner. The shaft 8 carries a pulley 9 for driving a belt 10 which, by way of example, extends upwardly through a slot 11 formed in the top 12 of cabinet 1.

Adapted to be arranged within a well 2, after a storage can has been removed is a freezer can 13 having a depending lug 14ª which is mounted in a removable support 15 positioned upon the bottom of well 2 prior to the arranging of the can 13 therein. A cover 14 is connected to top of can 13. Extending through the cover 14 axially thereof is a sleeve 15 provided at its upper end with a bevel gear 16 and having its lower end connected to a scraper element 17 operating within can 13. The lower end of element 17 has a bearing 18 which seats upon a bearing 19 on the upper face of the bottom of the can 13. Extending through sleeve 15 and the bottom of element 17 and having its lower end rotatably mounted in bearing 19 is a shaft 20 provided with agitators or paddles 21.

The shaft 20 projects above the gear 16 and has its upper end journaled, as at 22 in the removable top 23 of a gear box 24. The shaft 20 in proximity to its upper end is provided with a bevel gear 25 which is oppositely disposed with respect to gear 16. The sleeve 15 passes through a cover 26 for well 2. The cover 26 is of the flanged type for seating upon the top 12 and for extension into and to snugly engage the wall of well 2 at the upper end of the latter. The gear box 24 is open at its bottom, seats upon cover 26 and is formed with a horizontal opening 27.

Disposed at right angles to one side of gear box 24 is an extension of bracket-like form consisting of a pair of spaced, parallel side members 28', 28" integral at their inner ends with gear box 36 at opposite sides of opening 27. The outer ends of the sides 28', 28" are connected together by a boxing 29. The sides 28', 28" at the transverse centers thereof are connected together by a boxing 30. Arranged within the boxings 29, 30 and opening 27 are bushings 31. Each side of the extension 28 is formed with a laterally disposed depending combined spacing and supporting ear 32 adapted to be detachably secured to the top of cabinet 1 by the holdfast devices 33. One of the ears 32 is positioned at the outer end of extension 28 and the other ear between the transverse median of the latter and the gear box 24.

Journaled in the bushings 31 and extended through the gear box 26 is an operating shaft 34, carrying on its inner end a bevel gear 35 which meshes with and drives the gears 16 and 25. The shaft 34 projects from the outer end of extension 28 and carries a pulley 36 driven from belt 10.

The sleeve 15 is integral with the scraper element 17, and in connection with the latter and the gear 16 couples the covers or closures 14 and 26 together. The gear 25 on shaft 26 in connection with gear 16 couples the element 17 and agitators 21 together.

Although one form of power transmitting means from the motor to shaft 34 is illustrated, yet it is to be understood that any suitable driving connection from the motor to shaft 34 may be employed, and that shaft 34 can be driven from any suitable source of power.

What I claim is:—

1. In a portable ice cream freezing attachment for mechanical refrigerators of that type including a well for receiving a freezer can containing cream scraping and agitating devices, a portable structure consisting of an apertured closure for the can, an axially apertured closure for the well, inner and outer rotatable elements for operating said devices, said elements being arranged in concentric relation and with said inner element extending from the ends of said outer element, said outer element extending through the apertures of and permanently coupling said closures together, a gear box having a closed end, an open end and an opening in its side, the open end of said box being seated against one face of the well closure, said inner element being journaled in the closed end of said box, a gear within said box, fixed to one end of said outer element and opposing said face, a gear within said box, fixed to said inner element in proximity to said closed end and spaced from said other gear, an extension integral with said side adjacent the opening in the latter and disposed at right angles to said box, said extension being formed with spaced apertured means for the passage of holdfast devices to detachably anchor said structure upon the top of the refrigerator, and a driven shaft journaled in said extension, extending into said box and provided with means meshing with said gears for operating them.

2. In a portable ice cream freezing attachment for mechanical refrigerators of that type including a well for receiving a freezer can containing cream scraping and agitating devices, a portable structure consisting of an apertured closure for the can, an axially apertured closure for the well, inner and outer rotatable elements for operating said devices, said elements being arranged in concentric relation and with said inner element extending from the ends of said outer element, said outer element extending through the apertures of and permanently coupling said closures together, a gear box having a closed end, an open end and an opening in its side, the open end of said box being seated against one face of the well closure, said inner element being journaled in the closed end of said box, a gear within said box, fixed to one end of said outer element and opposing said face, a gear within said box, fixed to said inner element in proximity to said closed end and spaced from said other gear, an extension integral with said side adjacent the opening in the latter and disposed at right angles to said box, said extension being formed with spaced apertured means for the passage of holdfast devices to detachably anchor said structure upon the top of the refrigerator, and a driven shaft journaled in said extension, extending into said box and provided with means meshing with said gears for operating them, the closure for said well being of greater area than the closure for the can and of an area with respect to the well to extend into the top of the latter.

3. In a portable ice cream freezing attachment for mechanical refrigerators of that type including a well for receiving a freezer can containing cream scraping and agitating devices, a portable structure consisting of an apertured closure for the can, an axially apertured closure for the well, inner and outer rotatable elements for operating said devices, said elements being arranged in concentric relation and with said inner element extending from the ends of said outer element, said outer element extending through the apertures of and permanently coupling said closure together, a gear box having a closed end, an open end and an opening in its side, the open end of said box being seated against one face of the well closure, said inner element being journaled in the closed end of said box, a gear within said box, fixed to one end of said outer element and opposing said face, a gear within said box, fixed to said inner element in proximity to said closed end and spaced from said other gear, an extension integral with said side adjacent the opening in the latter and disposed at right angles to said box, said extension being formed with spaced apertured means for the passage of holdfast devices to detachably anchor said structure upon the top of the refrigerator, and a driven shaft journaled in said extension, extending into said box and provided with means meshing with said gears for operating them, the said extension being spaced from the ends of said box and the apertured means thereof providing for supporting the body of the extension on and for spacing such body from the refrigerator.

NELS T. SKOWLUND.